(12) United States Patent
Jiao

(10) Patent No.: US 11,638,083 B2
(45) Date of Patent: Apr. 25, 2023

(54) EARPHONE ABNORMALITY PROCESSING METHOD, EARPHONE, SYSTEM, AND STORAGE MEDIUM

(71) Applicant: GOERTEK INC., Shandong (CN)

(72) Inventor: Shanshan Jiao, Shandong (CN)

(73) Assignee: GOERTEK INC., Weifang (CN)

( * ) Notice: Subject to any disclaimer, the term of this patent is extended or adjusted under 35 U.S.C. 154(b) by 19 days.

(21) Appl. No.: 17/267,654

(22) PCT Filed: Dec. 27, 2018

(86) PCT No.: PCT/CN2018/124140
§ 371 (c)(1),
(2) Date: Feb. 10, 2021

(87) PCT Pub. No.: WO2020/042498
PCT Pub. Date: Mar. 5, 2020

(65) Prior Publication Data
US 2021/0195311 A1    Jun. 24, 2021

(30) Foreign Application Priority Data
Aug. 30, 2018  (CN) .......................... 201811004737.5

(51) Int. Cl.
*H04R 1/10* (2006.01)
*H04R 3/00* (2006.01)
(Continued)

(52) U.S. Cl.
CPC .......... *H04R 1/1041* (2013.01); *G06F 3/017* (2013.01); *G06F 3/041* (2013.01); *G10L 25/51* (2013.01);
(Continued)

(58) Field of Classification Search
CPC combination set(s) only.
See application file for complete search history.

(56) References Cited

U.S. PATENT DOCUMENTS 9,813,833 B1 * 11/2017  Vesa ..................... H04R 29/006
2003/0147540 A1 *  8/2003  Oster ....................... H04R 3/00
                                                                    381/92
(Continued)

FOREIGN PATENT DOCUMENTS

CN          103929707 A       7/2014
CN          203775374 U       8/2014
(Continued)

OTHER PUBLICATIONS

International Search Report, English Translation for PCT/CN2018/124140 filed Dec. 27, 2018, dated May 29, 2019.
(Continued)

*Primary Examiner* — Matthew A Eason
*Assistant Examiner* — Kuassi Ganmavo
(74) *Attorney, Agent, or Firm* — Workman Nydegger

(57) ABSTRACT

The embodiments of the present application provide an earphone abnormality processing method, an earphone, a system, and a storage medium. In the embodiments of the present application, an abnormal state self-detection function is added to an earphone of an existing dual-microphone, and when the earphone is in a self-detection state, acquiring a sound signal picked up from a specified sound source by a primary microphone and a secondary microphone; and determining the type of abnormal state of the earphone according to a frequency response curve of the sound signal picked up by the primary microphone and the secondary microphone, and further performing abnormality processing on the earphone by using a processing manner adapted to the abnormal state of the earphone, thereby solving the difficulty in the prior art of being unable to process the sound pickup abnormality of an earphone, and improving the usage performance of an earphone and also facilitating the prolonging of the service life of the earphone.

11 Claims, 2 Drawing Sheets

(51) Int. Cl.
    *G06F 3/01*           (2006.01)
    *H04M 1/60*         (2006.01)
    *G06F 3/041*        (2006.01)
    *H04R 1/40*         (2006.01)
    *H04R 29/00*       (2006.01)
    *H04M 1/724*       (2021.01)
    *G10L 25/51*        (2013.01)

(52) U.S. Cl.
    CPC .......... *H04M 1/6008* (2013.01); *H04M 1/724* (2021.01); *H04R 1/1016* (2013.01); *H04R 1/1025* (2013.01); *H04R 1/406* (2013.01); *H04R 3/005* (2013.01); *H04R 29/004* (2013.01); *H04R 29/005* (2013.01); *H04R 2201/105* (2013.01); *H04R 2499/11* (2013.01)

(56) References Cited

U.S. PATENT DOCUMENTS

| | | | | |
|---|---|---|---|---|
| 2004/0165735 | A1* | 8/2004 | Opitz | H04R 29/006 381/92 |
| 2005/0276423 | A1* | 12/2005 | Aubauer | H04R 3/005 381/91 |
| 2009/0290729 | A1* | 11/2009 | Zhang | H04R 29/006 381/122 |
| 2012/0045068 | A1* | 2/2012 | Kim | H04R 29/005 381/58 |
| 2012/0057733 | A1* | 3/2012 | Morii | H04R 25/407 381/313 |
| 2012/0130713 | A1* | 5/2012 | Shin | G10L 25/78 704/E15.001 |
| 2014/0037099 | A1 | 2/2014 | Friis et al. | |
| 2014/0369511 | A1* | 12/2014 | Sheerin | H04R 29/004 381/58 |
| 2015/0023510 | A1* | 1/2015 | Shimizu | H04R 29/001 381/58 |
| 2015/0030166 | A1* | 1/2015 | Ranieri | H04R 29/005 381/58 |
| 2017/0156005 | A1* | 6/2017 | Li | H04R 29/005 |
| 2018/0139554 | A1* | 5/2018 | Yang | H04R 3/005 |
| 2019/0014429 | A1* | 1/2019 | Luke | H04R 29/005 |
| 2019/0080682 | A1* | 3/2019 | Darlington | H04R 1/1083 |
| 2019/0149916 | A1* | 5/2019 | Takayama | H04R 3/005 381/26 |
| 2019/0306622 | A1 | 10/2019 | Yan | |

FOREIGN PATENT DOCUMENTS

| | | | | |
|---|---|---|---|---|
| CN | 105554674 | A | | 5/2016 |
| CN | 105979053 | A | | 9/2016 |
| CN | 106210219 | A | | 12/2016 |
| CN | 106302905 | A | | 1/2017 |
| CN | 106792415 | A * | 5/2017 | .......... H04R 29/004 |
| CN | 106911996 | A | | 6/2017 |
| CN | 107948900 | A | | 4/2018 |
| CN | 108076219 | A * | 5/2018 | ........ H04M 1/72522 |
| CN | 108076219 | A | | 5/2018 |
| CN | 108401218 | A * | 8/2018 | .......... H04R 1/1083 |
| CN | 108401218 | A | | 8/2018 |
| CN | 108430003 | A | | 8/2018 |
| WO | WO-2020019857 | A1 * | 1/2020 | .......... H04M 1/6066 |

OTHER PUBLICATIONS

Chinese First Office Action and English Translation dated Jul. 3, 2019 for Chinese Application No. 20181104737.5.

* cited by examiner

EARPHONE ABNORMALITY PROCESSING METHOD, EARPHONE, SYSTEM, AND STORAGE MEDIUM

This application is a National Stage application of PCT international application PCT/CN2018/124140, filed on Dec. 27, 2018, which claims priority to Chinese Patent Application No. 201811004737.5, titled "EARPHONE ABNORMALITY PROCESSING METHOD, EARPHONE, SYSTEM, AND STORAGE MEDIUM", filed on Aug. 30, 2018 with the Chine National Intellectual Property Administration (CNIPA), which are incorporated herein by reference in their entirety.

TECHNICAL FIELD

The present disclosure relates to the technical field of earphone, and particularly, to a method for processing earphone abnormality, an earphone, a system, and a storage medium.

BACKGROUND

With continuous development of earphone technology, an earphone with a call function gradually enters people's lives, which brings great convenience to people's lives. This kind of earphone, on a basis of an ordinary earphone, is equipped with a microphone to pick up a sound signal of a user and convert the sound signal of the user into an electrical signal for transmission to the other party who is talking with the user for listening.

The voice signal of the user is generally picked up by the microphone through a sound hole on a housing of the microphone. For a requirement of appearance design, the sound hole is generally small. Furthermore, in order to prevent dust, a layer of mesh cloth is generally pasted between the sound hole of the housing and a sound hole of the microphone device. Although the design of small sound hole and mesh cloth can prevent large foreign object from entering the microphone, tiny particles, liquids, and oily substances can still enter the microphone without being prevented, which causes the microphone to pick up abnormally and even be scrapped.

However, the existing earphone with the call function often has nothing to do with the above abnormal sound pickup by the microphone, which results in poor performance and short life of the earphone.

SUMMARY

A method for processing earphone abnormality, an earphone, a system, and a storage medium are provided in various aspects of the present disclosure, so as to improve the performance and life of the earphone.

A method for processing earphone abnormality is provided in embodiments of the present disclosure, which is applied to an earphone including a primary microphone and a secondary microphone, the method includes:

obtaining sound signals picked up by the primary microphone and the secondary microphone from a specified sound source when the earphone is in a self-detection state;

determining a type of abnormal state of the earphone according to frequency response curves of the sound signals picked up by the primary microphone and the secondary microphone; and processing abnormality on the earphone by using a processing manner adapted to the type of abnormal state of the earphone.

An earphone is also provided in embodiments of the present disclosure. The earphone includes a primary microphone, a secondary microphone, and a processes.

The primary microphone and the secondary microphone are configured to pick up sound signals from a specified sound source.

The processer is configured to: obtain the sound signals picked up by the primary microphone and the secondary microphone from the specified sound source when the earphone is in a self-detection state;

determine a type of abnormal state of the earphone according to frequency response curves of the sound signals picked up by the primary microphone and the secondary microphone; and process abnormality on the earphone by using a processing manner adapted to the type of abnormal state of the earphone A system for processing earphone abnormality is also provided in embodiments of the present disclosure. The system includes an earphone and a sound source device, the earphone includes a primary microphone and a secondary microphone, and the sound source device has fixed relative positions with the primary microphone and the secondary microphone.

The sound source device is configured to play a sound signal for the primary microphone and the secondary microphone to pick up;

The earphone is configured to: obtain sound signals picked up by the primary microphone and the secondary microphone when the earphone is in a self-detection state;

determine a type of abnormal state of the earphone according to frequency response curves of the sound signals picked up by the primary microphone and the secondary microphone; and process abnormality on the earphone by using a processing manner adapted to the type of abnormal state of the earphone.

A computer-readable storage medium with computer program stored thereon is also provided in embodiments of the present disclosure. When the computer program is executed, steps in the above method may be implemented.

In the embodiments of the present disclosure, a function of abnormal state self-detection is added to an existing dual-microphone earphone. When the earphone is in the self-detection state, the sound signals picked up by the primary microphone and the secondary microphone from the specified sound source are obtained; the type of abnormal state of the earphone is determined according to frequency response curves of the sound signals picked up by the primary microphone and the secondary microphone, and then the abnormality of the earphone is processed by using the processing manner adapted to the type of abnormal state of the earphone, which solves the problem in the prior art that the abnormal sound pickup of the earphone cannot be processed, thereby not only improving the performance of the earphone, but also increasing its service life.

BRIEF DESCRIPTION OF THE DRAWINGS

In order to more clearly explain the embodiments of the present invention or the technical solutions in the prior art, the drawings used in the description of the embodiments or the prior art will be briefly introduced below. Obviously, the drawings in the following description are merely a part of drawings of the present invention. For those of ordinary skill in the art, other drawings can be obtained according to the provided drawings without paying creative labor.

FIG. 1 is a structure diagram of a system for processing earphone abnormality according to an embodiment of the present disclosure.

DETAILED DESCRIPTION

The technical solutions of the present application will be described clearly and completely as follows in conjunction with the embodiments and corresponding accompany drawings of the present application, so that purposes, technical solutions and advantages of the present application can be more obvious. It is obvious that the described embodiments are only a part of embodiments of the present application, rather than all of the embodiments. All the other embodiments obtained by those skilled in the art based on the embodiments in the present application without any creative work belong to the scope of protection of the present application.

For the technical problem that an existing earphone has nothing to do with abnormal sound pickup of a microphone, which results in poor performance and short life of the earphone, embodiments of the present disclosure provide solutions. A basic idea is to add a function of abnormal state self-detection to an existing dual-microphone earphone. When the earphone is in the self-detection state, the sound signals picked up by the primary microphone and the secondary microphone from the specified sound source are obtained; the type of abnormal state of the earphone is determined according to frequency response curves of the sound signals picked up by the primary microphone and the secondary microphone, and then the abnormality of the earphone is processed by using the processing manner adapted to the type of abnormal state of the earphone, which solves the problem in the prior art the abnormal sound pickup of the earphone cannot be processed, thereby not only improving the performance of the earphone, but also increasing its service life.

Technical solutions provided by the embodiments of the present disclosure are described in detail in conjunction with drawings.

Figure 1:
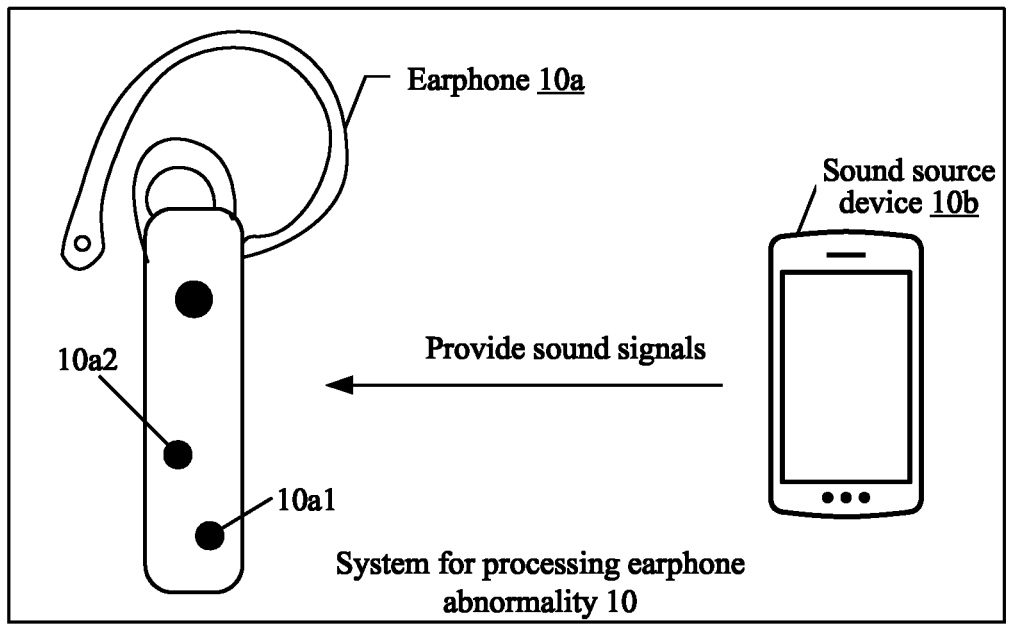

FIG. 1 is a structure diagram of a system for processing earphone abnormality according to an embodiment of the present disclosure. As illustrated in FIG. 1, the system 10 includes an earphone 10a and a sound source device 10b. The earphone 10a includes a primary microphone 10a1 and a secondary microphone 10a2, and the sound source device 10b has fixed relative positions with the primary microphone 10a1 and the secondary microphone 10a2, so that the earphone 10a may determine ideal sensitivities of sound signals picked up by the primary microphone 10a1 and the secondary microphone 10a2 under a normal condition. Preferably, a distance between the sound source device 10b and the primary microphone 10a1 is equal to a distance between the sound source device 10b and the secondary microphone 10a2. In this way, when sound pickup effects of the primary microphone 10a1 and the secondary microphone 10a2 are in an ideal state, sensitivities of the sound signals picked up by the two microphones are the same. Further, the sound source device 10b may be placed on a midperpendicular of a connecting line between the primary microphone 10a1 and the secondary microphone 10a2. In this way, under the ideal state, the sound signals received by the primary microphone 10a1 and the secondary microphone 10a2 are the same, that is, when the sound pickup effects of the two are both in the ideal state, the sound signals picked up by the two are exactly the same. That is, the sensitivities, frequencies, phases and the like of the sound signals picked up by the two are all the same, which is convenient for subsequent determination of abnormal sound pickup of the earphone 10a and abnormality processing. Implementation forms of the sound source device 10b and the earphone 10a illustrated in FIG. 1 are only examples, and implementation forms thereof are not limited.

In this embodiment, the sound source device 10b is an electronic device that can play a sound signal. It may be a mobile device such as a mobile phone, a notebook computer, a tablet computer, and a wearable device, or a player such as MP3 and MP4, but is not limited to these.

In this embodiment, the earphone 10a has a call function, and is provided with the primary microphone 10a1 and the secondary microphone 10a2. In the embodiments of the present disclosure, the specific implementation form of the earphone 10a is not limited. It may be a Bluetooth earphone. It may be classified into mono and dual from the number of channels, or may be classified into Head-mounted, in-ear, and hanging-ear in terms of wearing mode, but not limited to these.

In this embodiment, the sound source device 10b is configured to play the sound signal for the primary microphone 10a1 and the secondary microphone 10a2 to pick up the sound signal. Preferably, intensity of the sound signal played by the sound source device 10b is stable, and its intensity fluctuation is small, which may be less than a set fluctuation threshold. In this way, it is convenient to subsequently determine whether there is an abnormality according to frequency response curves of sound signals picked up by the primary microphone 10a1 and the secondary microphone 10a2. If the intensity of the sound signal played by the sound source device 10b itself fluctuates greatly, it is inconvenient to determine and process sensitivities of the frequency response curves of the sound signals picked up by the primary microphone 10a1 and the secondary microphone 10a2.

Correspondingly, when the earphone 10a is in the self-detection state, the sound signals picked up by the primary microphone 10a1 and the secondary microphone 10a2 may be obtained; whether the earphone 10a is abnormal and a type of abnormal state of the earphone 10a in the abnormal state are determined according to the frequency response curves of the sound signals picked up by the primary microphone 10a1 and the secondary microphone 10a2; and the abnormality of the earphone is processed by using a processing manner adapted to the type of abnormal state of the earphone.

Optionally, the earphone 10a may perform Fourier transform or Fast Fourier Transform (FFT) on the sound signals picked up by the primary microphone 10a1 and the secondary microphone 10a2 to obtain the frequency response curves of the sound signals.

In the system for processing earphone abnormality provided by this embodiment, the earphone is obtained by adding the function of abnormal state self-detection to the existing dual-microphone earphone. When the earphone is in the self-detection state, the sound signals picked up by the primary microphone and the secondary microphone from the specified sound source are obtained; the type of abnormal state of the earphone is determined according to frequency response curves of the sound signals picked up by the primary microphone and the secondary microphone, and then the abnormality of the earphone is processed by using the processing manner adapted to the type of abnormal state of the earphone, which solves the problem in the prior art that the abnormal sound pickup of the earphone cannot be processed, thereby not only improving the performance of the earphone, but also increasing its service life.

In the embodiments of the present disclosure, when the user finds that the earphone 10a picks up abnormally, for example, when the user uses the earphone 10a to talk, the other party cannot hear what the user is saying, the user may send a self-detection instruction to the earphone 10a, and the earphone 10a may respond to the self-detection instruction sent by the user to enter the self-detection state. A self-detection period may be preset. Whenever the self-detection period is reached, the earphone 10a automatically enters the self-detection state. An implementation of the earphone entering the self-detection state will be exemplified as follows.

Implementation 1: A self-detection button may be set on the earphone 10a. When the user wants to perform abnormal detection on the earphone according to the user's own needs, for example, when the user finds that the earphone 10a picks up abnormally, the user may start the self-detection button, and the earphone 10a enters the self-detection state in response to the operation of pressing the self-detection button. Optionally, the self-detection button may be a point-touch type or a long-press type, but it is not limited to this. Optionally, the user may place the sound source device 10b at a fixed position relative to the primary microphone 10a1 and the secondary microphone 10a2 of the earphone 10a before or after starting the self-detection button, and make the sound source device 10b play the above sound signal for the primary microphone 10a1 and the secondary microphone 10a2 to pick up the sound signal.

Implementation 2: A voice recognition module may be set on the earphone 10a. When the user wants to perform abnormal detection on the earphone according to the user's own needs, for example, when the user finds that the earphone 10a picks up abnormally, the user may issue a corresponding self-detection voice command, such as "please self-detection", to the earphone 10a. The earphone 10a enters the self-detection state in response to the self-detection voice command. Optionally, the user may place the sound source device 10b at a fixed position relative to the primary microphone 10a1 and the secondary microphone 10a2 of the earphone 10a before or after starting the self-detection button, and make the sound source device 10b play the above sound signal for the primary microphone 10a1 and the secondary microphone 10a2 to pick up the sound signal.

Implementation 3: In the earphone 10a, the self-detection period may be preset, and a timer or counter may be started to time the self-detection period. When the self-detection period arrives, the earphone 10a automatically enters the self-detection state. Optionally, when the self-detection period arrives, a prompt sound to enter the self-detection state may be sent to the user, so that the user, when receiving the prompt sound, places the sound source device 10b at a fixed position relative to the primary microphone 10a1 and the secondary microphone 10a2 of the earphone 10a, and makes the sound source device 10 to play the above sound signal for the primary microphone 10a1 and the secondary microphone 10a2 to pick up the sound signal. Optionally, the self-detection period may be flexibly set according to actual needs of the user and an application scenario. When the environment of the application scenario of the earphone is harsh, such as an application scenario with large outdoor dust, the self-detection period may be set to be shorter, for example, 5 hours, 1 day, or 2 days; when the environment of the application scenario of the earphone 10a is clean, such as an office, the self-detection period may be set to be longer, for example, 2 weeks, or 1 month, but it is not limited to this.

Implementation 4: The sound source device 10b may be a terminal device. An APP corresponding to the earphone 10a may be installed on the terminal device. When the user wants to perform abnormal detection on the earphone according to the user's own needs, for example, when the user finds that the earphone 10a picks up abnormally, the user may click a self-detection control on the corresponding APP to send a self-detection instruction to the earphone 10a. Accordingly, the earphone 10a enters the self-detection state in response to the self-detection instruction. Optionally, the terminal device may also play the above sound signal. That is, the user may place the terminal device at a fixed position relative to the primary microphone 10a1 and the secondary microphone 10a2 of the earphone 10a before or after starting the self-detection button and click to play an audio file pre-stored by the terminal device. The terminal device, in response to the play operation of the user, obtains a pre-stored sound signal whose signal sensitivity fluctuation rate is less than a set threshold, and plays the sound signal for the primary microphone 10a1 and the secondary microphone 10a2 to pick up the sound signal.

In Implementation 4, the terminal device and the earphone 10a may be wirelessly or wiredly connected. Optionally, the terminal device may communicate with the earphone 10a through a mobile network. Accordingly, a network standard of the mobile network may be any one of 2G (GSM), 2.5G (GPRS), 3G (WCDMA, TD-SCDMA, CDMA2000, UTMS), 4G (LTE), 4G+(LTE+), and WiMax. Optionally, the terminal device may communicate with the earphone 10a through Bluetooth, WiFi, or infrared.

In Implementation 4, the terminal device refers to a device that is used by the user and has functions such as computing, Internet access, communication, and voice playback required by the user. For example, the terminal device may be a smart phone, a tablet computer, a personal computer, and a wearable device. The terminal device usually includes at least one processing unit and at least one memory. The number of the processing unit and memory depends on a configuration and type of terminal device. The memory may include volatile memory such as RAM, non-volatile memory such as read-only Memory (ROM) or flash Memory, or both. The memory usually stores an Operating System (OS), one or more application software, and may also store program data and the like. In addition to the processing unit and memory, the terminal device may also include basic configurations such as a network card chip, an IO bus, and audio and video components. Optionally, according to an implementation form of the terminal device, the terminal device may also include some peripheral devices, such as a keyboard, a mouse, a stylus, and a printer. These peripheral devices are well known in the art and will not be described in detail here.

In this embodiment of this disclosure, the sound source device 10b has fixed position relationships with the primary microphone 10a1 and the secondary microphone 10a2, and the sensitivity of the sound signal played by the sound source device 10b in a certain frequency band is known, therefore when the sound signal played by the sound source device 10b reaches the primary microphone 10a1 and the secondary microphone 10a2, ideal signal sensitivities of the primary microphone 10a1 and the secondary microphone 10a2 to the sound signal under a set frequency band in an ideal condition may be determined according to the relative position relationship between the sound source device 10b, the primary microphone 10a1 and the secondary microphone 10a2. The signal sensitivities refer to sensitivities of the sound signals picked up by the primary microphone 10a1 and the secondary microphone 10a2 within the set frequency band, with the unit being dB.

Based on the above analysis, a sensitivity threshold may be preset, and according to the frequency response curves of the sound signals picked up by the primary microphone 10a1 and the secondary microphone 10a2, the signal sensitivities of the primary microphone 10a1 and the secondary microphone 10a2 in the set frequency band are obtained respectively; and whether the earphone 10a is abnormal is determined according to a relationship between the signal sensitivities of the primary microphone 10a1 and the secondary microphone 10a2 in the set frequency band and the sensitivity threshold.

In application scenario A, the sensitivity of a microphone to the sound signal being less than the preset sensitivity threshold indicates that the microphone is damaged or a foreign object equivalent to a sound hole of the microphone enters the sound hole and seriously blocks a sound path, which results in a significant decrease in the sensitivity of the microphone. This situation causes loss of a sound pickup function of the earphone 10a, and thus the earphone 10a cannot be used for normal calls. However, when only one of the primary microphone 10a1 and the secondary microphone 10a2 has the sensitivity less than the preset sensitivity threshold, it means that one of the primary microphone 10a1 and the secondary microphone 10a2 of the earphone 10a still can pick up sound, and the earphone can be used to make calls. For the sake of description and distinction, the abnormal condition in which only one of the primary microphone 10a1 and the secondary microphone 10a2 has the sensitivity to the sound signal less than the preset sensitivity threshold is defined as a first type of abnormal state.

Based on the above application scenario A, if the signal sensitivity of only one of the primary microphone 10a1 and the secondary microphone 10a2 in the set frequency band is greater than the preset sensitivity threshold, it is determined that the earphone 10a is abnormal and belongs to the first type of abnormal state. The sensitivity threshold may be flexibly set according to a specific structure and performance of the earphone 10a. In general, in order to more accurately determine whether the earphone 10a is in the first type of abnormal state, the sensitivity threshold is generally set to a small value. Optionally, the sensitivity threshold may be −40 dB.

The set frequency band may be flexibly set according to a call mode supported by the earphone 10a. In general, the earphone 10a is divided into a narrowband call mode and a broadband call mode. In order to test whether the earphone 10a picks up abnormally in the entire call frequency band, the set frequency band may be set to a frequency band corresponding to the broadband call mode, that is, 100 Hz-6.3 kHz.

Considering that the existing earphone with dual microphones generally has a dual microphone noise reduction function. Its basic principle is that one microphone is a microphone used by the user during a call to collect human voices, while the other has a background noise collection function to facilitate collection of ambient noise. In this way, when the user is calling, the other microphone collects a noisy background sound. After a series of hardware precision filtering and enhanced real-time signal operation processing, the noisy background sound is compared with a background noise information database, and then superimposed on the original call signal according to a principle of signal elimination to achieve an effect of eliminating noise and improving call quality. However, when the earphone 10a is in the above first type of abnormal state, that is, one of the primary microphone 10a1 and the secondary microphone 10a2 cannot pick up the sound signal, the dual microphone noise reduction function of the earphone 10a is less effective, which affects a quality of the call made by the earphone 10a. Based on this, a single microphone noise reduction function may be added to the earphone 10a. When it is determined that the abnormal state of the earphone 10a belongs to the above first type of abnormal state, a dual microphone noise reduction algorithm is switched to a single microphone noise reduction algorithm to improve the quality of the call of the earphone 10a, thereby improving the performance of the earphone 10a.

It is to be noted that when the signal sensitivities of the primary and secondary microphone 10a1 and the secondary microphone 10a2 in the set frequency band are both less than the preset sensitivity threshold, it means that the primary and secondary microphone 10a1 and the secondary microphone 10a2 of the earphone 10a have almost lost the sound pickup function, and no longer available. The embodiments of the present disclosure do not deal with this situation.

Correspondingly, when the signal sensitivities of both the primary and secondary microphone 10a1 and the secondary microphone 10a2 in the set frequency band are greater than the preset sensitivity threshold, it means that the primary microphone 10a1 and the secondary microphone 10a2 have certain sound pickup function. However, since the sensitivity threshold is generally set low, it does not mean that the sound pickup effects of the primary microphone 10a1 and the secondary microphone 10a2 are in the ideal state, and there may be other abnormal states. Hereinafter, when the signal sensitivities of the primary and secondary microphone 10a1 and the secondary microphone 10a2 in the set frequency band are both greater than the preset sensitivity threshold, a case where the earphone 10a determines and processes other abnormal states is exemplified.

In application scenario B, a viscous liquid material may cover a dust-proof mesh cloth of the primary microphone 10a1 and/or the secondary microphone 10a2, which results in an overall increase in acoustic resistance and a decrease in signal sensitivity. Also, because the sound source device 10b has fixed position relationships with the primary microphone 10a1 and the secondary microphone 10a2, an absolute value of difference between the frequency response curves of the sound signals picked up by the primary microphone 10a1 and the secondary microphone 10a2 should be constant or less than a difference threshold in the ideal situation. If the absolute value of the difference between the frequency response curves of the sound signals picked up by the primary microphone 10a1 and the secondary microphone 10a2 is greater than the difference threshold, it means that one of the primary microphone 10a1 and the secondary microphone 10a2 picks up abnormally, and the overall sensitivity of the microphone that picks up abnormally in the set frequency band is reduced to a certain extent. For the sake of description and distinction, this type of abnormal state is defined as a second type of abnormal state.

Based on the application scenario B, when the earphone 10a does not belong to the first type of abnormal state, the difference between the frequency response curves of the sound signals picked up by the primary microphone 10a1 and the secondary microphone 10a2 may be calculated to obtain a frequency response difference curve, and whether an absolute value of the frequency response difference curve in the set frequency band is within a first sensitivity range may be determined. If a determination result indicates that the absolute value is within the first sensitivity range, it is determined that the earphone is abnormal and belongs to the second type of abnormal state.

Further, in order to enhance accuracy of the earphone 10a in determining and processing the abnormal state, an average value of the absolute value of difference corresponding to each frequency point in the set frequency band of the frequency response difference curve may be taken, and whether the average value is within the first sensitivity range may be determined. When the average value is within the first sensitivity range, it is determined that the earphone 10a is abnormal and belongs to the second type of abnormal state.

Or, in order to prevent misjudgment of the type of abnormal state caused by only individual frequency abnormal points being in the first sensitivity range or not in the first sensitivity range, a ratio threshold may be set. For the sake of description and distinction, the ratio threshold is defined as a first ratio threshold. When a ratio of all of each frequency point of the frequency response difference curve in the set frequency band whose absolute value is within the first sensitivity range to the entire set frequency band is greater than the set first ratio threshold, it is determined that the earphone 10a is abnormal and belongs to the second type of abnormal state.

Considering that the second type of abnormal state is due to the overall sensitivity of the microphone that picks up abnormally in the set frequency band being reduced to a certain extent, then when it is determined that the earphone 10a belongs to the second type of abnormal state, gain compensation may be performed on one of the primary microphone and the secondary microphone which picks up the sound signal with lower sensitivity, so that the absolute value of the frequency response difference curve of the sound signals picked up by the microphone that picks up abnormally and the other microphone is less than a lower limit sensitivity value of the first sensitivity range.

Further, since the second type of abnormal state is due to the overall sensitivity of the microphone that picks up abnormally in the set frequency band being reduced to a certain extent, the sensitivity of the sound signal of the microphone in the entire set frequency band is almost the same. Therefore, gain compensation may be performed on the microphone with lower sensitivity according to the sensitivity of the frequency response difference curve in the set frequency band, so that the sensitivity of the corrected frequency response difference curve in the set frequency band is less than the lower limit sensitivity value of the first sensitivity range.

Optionally, for the microphone with lower signal sensitivity, when gain compensation is performed on the frequency response curve of the microphone according to the sensitivity of the frequency response difference curve in the set frequency band, sensitivity of any frequency point in the set frequency band may be referred to perform gain compensation in the entire set frequency band, such as 1 kHz, or 2 kHz. Or, the average value of the sensitivity of the frequency response curve of the microphone in the set frequency band may be taken, and gain compensation may be performed on the microphone with lower signal sensitivity in the set frequency band based on the average value, until the sensitivity of the corrected frequency response difference curve in the set frequency band is less than the lower limit sensitivity value of the first sensitivity range.

It is to be noted that in this embodiment, the first sensitivity range may be set flexibly based on factory performance of the earphone 10a and compatibility of the dual microphone noise reduction algorithm inside the earphone with the difference between the frequency response curves of the primary microphone 10a1 and the secondary microphone 10a2. Generally, the compatibility of the dual microphone noise reduction algorithm with the difference between the frequency response curves of the primary microphone 10a1 and the secondary microphone 10a2 is 6 dB. Therefore, the lower limit sensitivity value of the first sensitivity range may be set to 6 dB. Different earphones 10a have different sensitivities to the sound signal, and allowable differences between the frequency response curves of the primary microphone 10a1 and the secondary microphone 10a2 of different earphones are different. Generally, when the difference between the frequency response curves of the primary microphone 10a1 and the secondary microphone 10a2 is greater than a certain threshold, the microphone with lower sensitivity is damaged. Therefore, an upper limit sensitivity value of the first sensitivity range may be flexibly set according to the difference in the frequency response curves allowed by the performance of the earphone 10a. Optionally, the difference between the frequency response curves of the secondary microphones 10a1 and 10a2 allowed by the earphone 10a is generally 12 dB. Therefore, the upper limit sensitivity value of the first sensitivity range may be set to 12 dB. Based on this, the first sensitivity range may be set to 6 dB-12 dB.

Based on the above analysis, due to the compatibility of the dual microphone noise reduction algorithm inside the earphone with the difference between the frequency response curves of the primary microphone 10a1 and the secondary microphone 10a2, the embodiments of the present disclosure do not deal with a case where the absolute value of the frequency response difference curve in the set frequency band is less than the lower limit sensitivity value of the first sensitivity range. Because when the absolute value of the frequency response difference curve is greater than the upper limit sensitivity value of the first sensitivity range, the microphone with lower sensitivity to the sound signal among the primary microphone 10a1 and the secondary microphone 10a2 may be damaged, which belongs to the first type of abnormal state in the embodiments of the present disclosure, then the above-mentioned manner corresponding to the first type of abnormal state may be used to process abnormality on the earphone 10a.

In application scenario C, considering a case that the sound hole or mesh cloth of the primary microphone 10a1 and the secondary microphone 10a2 of the earphone 10a is not completely blocked by the foreign object, but only partially blocked, pickup of a low-frequency sound signal by the microphone is not affected, while sensitivity of mid-high frequency sound signal picked up is attenuated. For the sake of description and distinction, this type of abnormal state of the earphone 10a is defined as a third type of abnormal state.

Based on application scenario C, if the absolute value of the frequency response difference curve in the set frequency band is not within the first sensitivity range in the above application scenario B, that is, it is determined that the earphone 10a does not belong to the second type of abnormal state, it may be determined that whether sensitivity of the earphone 10a to mid-high frequency sound signals is abnormal. Further, a first sub frequency band may be selected from the set frequency band, and an upper limit frequency of the first sub frequency band is the same with that of the set frequency band. If the absolute value of the frequency response difference curve in the first sub frequency band is within a second sensitivity range, it is determined that the earphone 10a is abnormal and belongs to a third type of abnormal state.

A lower limit frequency of the first sub frequency band may be flexibly set according to the performance of the earphone 10a, and the upper limit frequency of the first sub frequency band is equal to the upper limit frequency of the above set frequency band. Generally, the mid-to-high frequency band of the earphone 10a is 1 kHz-6.3 kHz, therefore, the first sub frequency band may be set to 1 kHz-6.3 kHz.

It is to be noted that the sensitivities of the earphone 10a to the sound signal in different frequency bands may be different, and the allowable differences between the frequency response curves of the primary microphone 10a1 and the secondary microphone 10a2 are also different. Based on this, the second sensitivity range may be the same with or different from the first sensitivity range, and may be flexibly set according to the performance of the earphone 10a.

Further, in order to enhance the accuracy of the earphone 10a in determining and processing the abnormal state, an average value of an absolute value of difference corresponding to each frequency point of the frequency response difference curve in the first sub frequency band may be taken, and whether the average value is within the second sensitivity range may be determined. When the average value is within the second sensitivity range, it is determined that the earphone 10a is abnormal and belongs to the third type of abnormal state.

Or, in order to prevent misjudgment of the type of abnormal state type caused by only individual frequency abnormal points being in the second sensitivity range or not in the second sensitivity range, a ratio threshold may be set. For the sake of description and distinction, the ratio threshold is defined as a second ratio threshold. When a ratio of all of each frequency point of the frequency response difference curve in the first sub frequency band whose absolute value is within the second sensitivity range to the first sub frequency band is greater than the set second ratio threshold, it is determined that the earphone 10a is abnormal and belongs to the third type of abnormal state.

Considering that the third type of abnormal state is due to the sensitivity of the microphone that picks up abnormally in the first sub frequency band is reduced to a certain extent, then when it is determined that the earphone 10a belongs to the third type of abnormal state, gain compensation may be performed on one of the primary microphone and the secondary microphone which picks up the sound signal with the lower sensitivity.

It is further considered that the third type of abnormal state does not affect the pickup of the low-frequency signal by the primary microphone 10a1 and the secondary microphone 10a2 of the earphone 10a, but causes the sensitivity to the mid-high frequency sound signal to decrease. Based on this, an equalizer (EQ) compensation algorithm may be used to perform gain compensation on the microphone with the lower sensitivity in the first sub frequency band, so that the sensitivity of the corrected frequency response difference curve in the first sub frequency band is smaller than a lower limit sensitivity value of the second sensitivity range. The EQ compensation algorithm may adjust gain of the microphone with lower sensitivity at each frequency point of the first sub frequency band signal and perform gain compensation for different sensitivity of each frequency point.

Due to the compatibility of the dual microphone noise reduction algorithm inside the earphone with the difference between the frequency response curves of the primary microphone 10a1 and the secondary microphone 10a2, the embodiments of the present disclosure do not deal with the case where the absolute value of the frequency response difference curve in the first sub frequency band is less than the lower limit sensitivity value of the second sensitivity range. Because when the absolute value of the frequency response difference curve is greater than an upper limit sensitivity value of the second sensitivity range, the microphone with lower sensitivity to the sound signal among the primary microphone 10a1 and the secondary microphone 10a2 may be damaged, which belongs to the first type of abnormal state in the embodiments of the present disclosure, then, the above-mentioned manner corresponding to the first type of abnormal state may be used to process abnormality on the earphone 10a.

In application scenario D, the primary microphone 10a1 and the secondary microphone 10a2 of the earphone 10a may have normal sensitivities to the low-frequency sound signal, but their sensitivities to high-frequency sound signal is invalid. For the sake of description and distinction, this type of abnormal state is defined as a fourth type of abnormal state.

Based on application scenario D, when it is determined that the absolute value of the frequency response difference curve of the sound signal picked up by the primary microphone 10a1 and the secondary microphone 10a2 in the first sub frequency band is not within the second sensitivity range, that is, the abnormality of the earphone 10a does not belong to the third type of abnormal state, it is further determined whether the signal sensitivity of the earphone 10a in the high frequency band is abnormal. Further, a second sub frequency band may be selected from the first sub frequency band, and an upper limit frequency of the second sub frequency band is the same as that of the first sub frequency band. If an absolute value of the frequency response difference curve in the second sub frequency band is greater than the upper limit value of the second sensitivity range, it is determined that the earphone is abnormal and belongs to the fourth type of abnormal state.

Further, in order to enhance the accuracy of the earphone 10a in determining and processing the abnormal state, an average value of an absolute value of difference corresponding to each frequency point of the frequency response difference curve in the second sub frequency band may be taken, and whether the average value is greater than the upper limit value of the second sensitivity range may be determined. When the average value is greater than the upper limit value of the second sensitivity range, it is determined that the earphone 10a is abnormal and belongs to the fourth type of abnormal state.

Or, in order to prevent misjudgment of the type of abnormal state type caused by only individual frequency abnormal points being in the second sensitivity range or not in the second sensitivity range, a ratio threshold may be set. For the sake of description and distinction, the ratio threshold is defined as a third ratio threshold. When a ratio of all of each frequency point of the frequency response difference curve in the second sensitivity range whose absolute value is greater than the upper limit value of the second sensitivity range to the second sub frequency band is greater than the set third ratio threshold, it is determined that the earphone 10a is abnormal and belongs to the fourth type of abnormal state.

Considering that the earphone 10a generally supports the narrowband call mode and the broadband call mode, the second sub frequency band may be set according to frequency bands of the narrowband call mode and the broadband call mode supported by the earphone 10a. The narrowband call mode generally supports a frequency band of 100-3.4 kHz, and the broadband call mode generally supports a frequency band of 100 kHz-6.3 kHz. Based on this, the second sub frequency band may be set to 3 kHz-6.3 kHz. In this way, when it is determined that the earphone 10a belongs to the fourth type of abnormal state, the broadband call mode may be disabled and the narrowband call mode may be enabled, thereby avoiding high-frequency noise from affecting the quality of the call and improving the performance of the earphone 10a.

In addition to the system for processing earphone abnormality provided in the foregoing embodiments, a method for processing earphone abnormality is also provided in the embodiments of the present disclosure, which is applied to an earphone including a primary microphone and a secondary microphone. The following will exemplify the method for processing earphone abnormality provided in the embodiments of the present disclosure from a perspective of the earphone.

Figure 2:
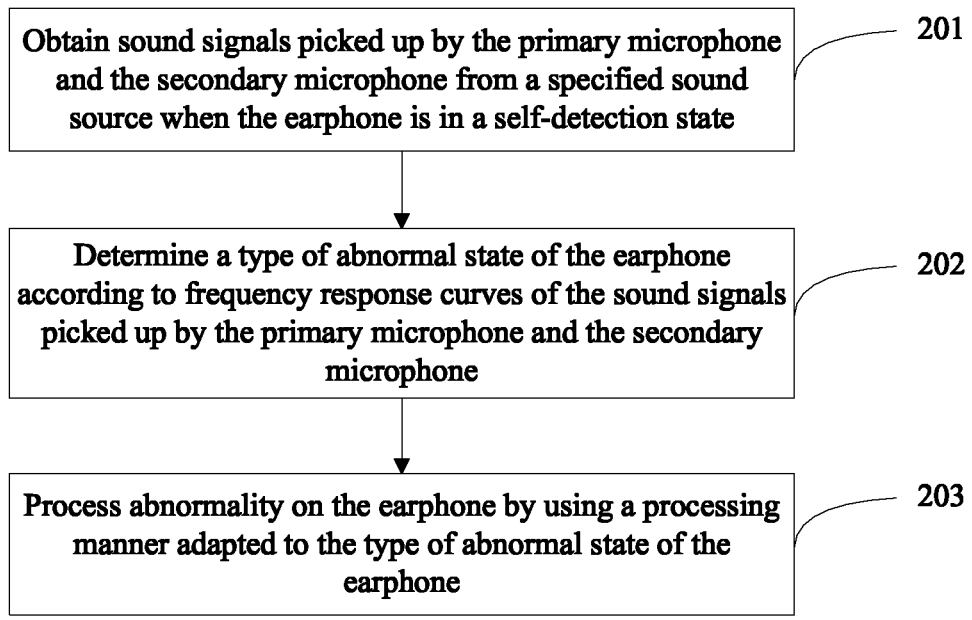
FIG. 2 is a flow diagram of a method for processing earphone abnormality according to an embodiment of the present disclosure.

FIG. 2 is a flow diagram of the method for processing earphone abnormality according to an embodiment of the present disclosure. The method is applied to an earphone including a primary microphone and a secondary microphone. As illustrated in FIG. 2, the method includes steps S201 to S203.

In step S201, sound signals picked up by the primary microphone and the secondary microphone from a specified sound source are obtained when the earphone is in a self-detection state.

In step S202, a type of abnormal state of the earphone is determined according to frequency response curves of the sound signals picked up by the primary microphone and the secondary microphone.

In step S203, abnormality on the earphone is processed by using a processing manner adapted to the type of abnormal state of the earphone.

In this embodiment, a function of abnormal state self-detection is added to an existing dual-microphone earphone. When the earphone is in the self-detection state, the sound signals picked up by the primary microphone and the secondary microphone from the specified sound source are obtained; the type of abnormal state of the earphone is determined according to frequency response curves of the sound signals picked up by the primary microphone and the secondary microphone, and then the abnormality of the earphone is processed by using the processing manner adapted to the type of abnormal state of the earphone, which solves the problem in the prior art that the abnormal sound pickup of the earphone cannot be processed, thereby not only improving the performance of the earphone, but also increasing its service life.

Optionally, in step S201, the specified sound source has fixed relative positions with the primary microphone and the secondary microphone, so that ideal sensitivities of sound signals picked up by the primary microphone and the secondary microphone under a normal condition may be determined. Preferably, a distance between the specified sound source and the primary microphone is equal to a distance between the specified sound source and the secondary microphone. In this way, when sound pickup effects of the primary microphone and the secondary microphone are in an ideal state, sensitivities of the sound signals picked up by the two microphones are the same. Further, the specified sound source may be placed on a midperpendicular of a connecting line between the primary microphone and the secondary microphone. In this way, under the ideal state, the sound signals received by the primary microphone and the secondary microphone are the same, that is when the sound pickup effects of the two are both in the ideal state, the sound signals picked up by the two are exactly the same. That is, the sensitivities, frequencies, phases and the like of the sound signals picked up by the two are all the same, which is convenient for subsequent determination of abnormal sound pickup of the earphone and abnormality processing in steps S202 and S203.

In step S201, in response to a self-detection instruction sent by the user when the user finds that the earphone pickup is abnormal, the earphone may be controlled to enter the self-detection state. A self-detection period may be preset. Whenever the self-detection period is reached, the earphone is controlled to enter the self-detection state. A specific implementation of the earphone entering the self-detection state may refer to relevant content of the implementations 1 to 4 in the foregoing system embodiment, which is not repeated here.

Further, one optional implementation of step S202 is to perform Fourier transform or FFT on the sound signals picked up by the primary microphone and the secondary microphone to obtain the frequency response curves of the sound signals.

In this embodiment, the specified sound source has fixed position relationships with the primary microphone and the secondary microphone, and the sensitivity of the sound signal played by the specified sound source in a certain frequency band is known, therefore when the sound signal played by the specified sound source reaches the primary microphone and the secondary microphone, ideal signal sensitivities of the primary microphone and the secondary microphone to the sound signal under a set frequency band in an ideal condition may be determined according to the relative position relationship between the specified sound source, the primary microphone and the secondary microphone. The signal sensitivities refer to sensitivities of the sound signals picked up by the primary microphone and the secondary microphone within the set frequency band, with the unit being dB.

Based on the above analysis, a sensitivity threshold may be preset, and according to the frequency response curves of the sound signals picked up by the primary microphone and the secondary microphone, the signal sensitivities of the primary microphone and the secondary microphone in the set frequency band are obtained respectively; and whether the earphone is abnormal is determined according to a relationship between the signal sensitivities of the primary microphone and the secondary microphone in the set frequency band and the sensitivity threshold.

Based on the above application scenario A, one optional implementation of step S202 is that if the signal sensitivity of only one of the primary microphone and the secondary microphone in the set frequency band is greater than the preset sensitivity threshold, it is determined that the earphone is abnormal and belongs to the first type of abnormal state. The sensitivity threshold may be flexibly set according to a specific structure and performance of the earphone. In general, in order to more accurately determine whether the earphone is in the first type of abnormal state, the sensitivity threshold is generally set to a small value. Optionally, the sensitivity threshold may be −40 dB.

The set frequency band may be flexibly set according to a call mode supported by the earphone. In general, the earphone is divided into a narrowband call mode and a broadband call mode. In order to test whether the earphone picks up abnormally in entire call frequency band, the set frequency band may be set to a frequency band corresponding to the broadband call mode, that is, 100 Hz-6.3 kHz.

Considering that the existing earphone with dual microphones generally has a dual microphone noise reduction function. Its basic principle may refer to relevant description of the foregoing system embodiment, which is no repeated here. When the earphone is in the above first type of abnormal state, that is, one of the primary microphone and the secondary microphone cannot pick up the sound signal, the dual microphone noise reduction function of the earphone is less effective, which affects a quality of the call made by the earphone. Based on this, one optional implementation of step S203 is that a single microphone noise reduction function may be added to the earphone. When it is determined that the abnormal state of the earphone belongs to the above first type of abnormal state, a dual microphone noise reduction algorithm is switched to a single microphone noise reduction algorithm to improve the quality of the call of the earphone, thereby improving the performance of the earphone.

For cases that when the signal sensitivities of the primary and secondary microphone and the secondary microphone in the set frequency band are both less than, or both greater than the preset sensitivity threshold, please refer to relevant description of the foregoing system embodiment, which is not be repeated here.

Correspondingly, when the signal sensitivities of both the primary and secondary microphone and the secondary microphone in the set frequency band are greater than the preset sensitivity threshold, it means that the primary microphone and the secondary microphone have certain sound pickup function. However, since the sensitivity threshold is generally low, it does not mean that the sound pickup effects of the primary microphone and the secondary microphone are in the ideal state, and there may be other abnormal states. Hereinafter, when the signal sensitivities of the primary and secondary microphone and the secondary microphone in the set frequency band are both greater than the preset sensitivity threshold, a case where the earphone determines and processes other abnormal states is exemplified.

Based on the application scenario B in the above system embodiment, further, in step S202, when the earphone does not belong to the first type of abnormal state, the difference between the frequency response curves of the sound signals picked up by the primary microphone and the secondary microphone may be calculated to obtain a frequency response difference curve, and whether an absolute value of the frequency response difference curve in the set frequency band is within a first sensitivity range may be determined. If a determination result indicates that the absolute value is within the first sensitivity range, it is determined that the earphone is abnormal and belongs to the second type of abnormal state.

Further, in order to enhance accuracy of the earphone in determining and processing the abnormal state, an average value of the absolute value of difference corresponding to each frequency point in the set frequency band of the frequency response difference curve may be taken, and whether the average value is within the first sensitivity range may be determined. When the average value is within the first sensitivity range, it is determined that the earphone 10a is abnormal and belongs to the second type of abnormal state.

Or, in order to prevent misjudgment of the type of abnormal state caused by only individual frequency abnormal points being in the first sensitivity range or not in the first sensitivity range, a ratio threshold may be set. For the sake of description and distinction, the ratio threshold is defined as a first ratio threshold. When a ratio of all of each frequency point of the frequency response difference curve in the set frequency band whose absolute value is within the first sensitivity range to the entire set frequency band is greater than the set first ratio threshold, it is determined that the earphone is abnormal and belongs to the second type of abnormal state.

Considering that the second type of abnormal state is due to the overall sensitivity of the microphone that picks up abnormally in the set frequency band being reduced to a certain extent, then in the step S203, when it is determined that the earphone belongs to the second type of abnormal state, gain compensation may be performed on one of the primary microphone and the secondary microphone which picks up the sound signal with a lower sensitivity, so that the absolute value of the frequency response difference curve of the sound signals picked up by the microphone that picks up abnormally and the other microphone is less than a lower limit sensitivity value of the first sensitivity range.

Further, since the second type of abnormal state is due to the overall sensitivity of the microphone that picks up abnormally in the set frequency band being reduced to a certain extent, the sensitivity of the sound signal of the microphone in the entire set frequency band is almost the same. Therefore, gain compensation may be performed on the microphone with lower sensitivity according to the sensitivity of the frequency response difference curve in the set frequency band, so that the sensitivity of the corrected frequency response difference curve in the set frequency band is less than the lower limit sensitivity value of the first sensitivity range.

Optionally, for the microphone with lower signal sensitivity, when gain compensation is performed on the frequency response curve of the microphone according to the sensitivity of the frequency response difference curve in the set frequency band, sensitivity of any frequency point in the set frequency band may be referred to perform gain compensation in the entire set frequency band, such as 1 kHz, or 2 kHz. Or, the average value of the sensitivity of the frequency response curve of the microphone in the set frequency band may be taken, and gain compensation may be performed on the microphone with lower signal sensitivity in the set frequency band based on the average value, until the sensitivity of the corrected frequency response difference curve in the set frequency band is less than the lower limit sensitivity value of the first sensitivity range.

For setting of the first sensitivity range and the set frequency band, and processing for the case where the absolute value of the frequency response difference curve is not within the first sensitivity range, please refer to relevant description of the above system embodiment, which is not repeated here.

Based on the application scenario C in the system embodiment, if in the above application scenario B, the absolute value of the frequency response difference curve in the set frequency band is not within the first sensitivity range, that is, it is determined that the earphone does not belong to the second type of abnormal state, then in the step S202, it may be determined that whether sensitivity of the earphone to mid-high frequency sound signals is abnormal. Further, a first sub frequency band may be selected from the set frequency band, and an upper limit frequency of the first sub frequency band is the same with that of the set frequency band. If the absolute value of the frequency response difference curve in the first sub frequency band is within a second sensitivity range, it is determined that the earphone is abnormal and belongs to the third type of abnormal state. For setting of the first sub frequency band and the second sensitivity range, please refer to relevant description of the above system embodiment, which is not repeated here.

Further, in order to enhance the accuracy of the earphone in determining and processing the abnormal state, an average value of an absolute value of difference corresponding to each frequency point of the frequency response difference curve in the first sub frequency band may be taken, and whether the average value is within the second sensitivity range may be determined. When the average value is within the second sensitivity range, it is determined that the earphone is abnormal and belongs to the third type of abnormal state.

Or, in order to prevent misjudgment of the type of abnormal state type caused by only individual frequency abnormal points being in the second sensitivity range or not in the second sensitivity range, a ratio threshold may be set. For the sake of description and distinction, the ratio threshold is defined as a second ratio threshold. When a ratio of all of each frequency point of the frequency response difference curve in the first sub frequency band whose absolute value is within the second sensitivity range to the first sub frequency band is greater than the set second ratio threshold, it is determined that the earphone is abnormal and belongs to the third type of abnormal state.

Considering that the third type of abnormal state is due to overall sensitivity of the microphone that picks up abnormally in the first sub frequency band being reduced to a certain extent, then when it is determined that the earphone belongs to the third type of abnormal state, gain compensation may be performed on one of the primary microphone and the secondary microphone which picks up the sound signal with the lower sensitivity in step S203.

It is further considered that the third type of abnormal state does not affect the pickup of the low-frequency signal by the primary microphone and the secondary microphone of the earphone, but causes the sensitivity to the mid-high frequency sound signals to decrease. Based on this, an equalizer (EQ) compensation algorithm may be used to perform gain compensation on the microphone with the lower sensitivity in the first sub frequency band, so that the sensitivity of the corrected frequency response difference curve in the first sub frequency band is smaller than a lower limit sensitivity value of the second sensitivity range. The EQ compensation algorithm may adjust gain of the microphone with lower sensitivity at each frequency point of the first sub frequency band signal and perform gain compensation for different sensitivity of each frequency point.

For processing the case where the absolute value of the frequency response difference curve in the first sub frequency band is not within the second sensitivity range, please refer to relevant description of the above system embodiment, which is not repeated here.

Based on application scenario D in the system embodiment, when it is determined that the absolute value of the frequency response difference curve of the sound signals picked up by the primary microphone and the secondary microphone in the first sub frequency band is not within the second sensitivity range, that is, the abnormality of the earphone does not belong to the third type of abnormal state, it is further determined whether the signal sensitivity of the earphone in the high frequency band is abnormal. Further, a second sub frequency band may be selected from the first sub frequency band, and an upper limit frequency of the second sub frequency band is the same as that of the first sub frequency band. If an absolute value of the frequency response difference curve in the second sub frequency band is greater than the upper limit value of the second sensitivity range, it is determined that the earphone is abnormal and belongs to the fourth type of abnormal state.

Further, in order to enhance the accuracy of the earphone in determining and processing the abnormal state, an average value of an absolute value of difference corresponding to each frequency point of the frequency response difference curve in the second sub frequency band may be taken, and whether the average value is greater than the upper limit value of the second sensitivity range may be determined. When the average value is greater than the upper limit value of the second sensitivity range, it is determined that the earphone is abnormal and belongs to the fourth type of abnormal state.

Or, in order to prevent misjudgment of the type of abnormal state type caused by only individual frequency abnormal points being in the second sensitivity range or not in the second sensitivity range, a ratio threshold may be set. For the sake of description and distinction, the ratio threshold is defined as a third ratio threshold. When a ratio of all of each frequency point of the frequency response difference curve in the second sensitivity range whose absolute value is greater than the upper limit value of the second sensitivity range to the second sub frequency band is greater than the third ratio threshold, it is determined that the earphone is abnormal and belongs to the fourth type of abnormal state.

Considering that the earphone generally supports the narrowband call mode and the broadband call mode, the second sub frequency band may be set according to frequency bands of the narrowband call mode and the broadband call mode supported by the earphone. The narrowband call mode generally supports a frequency band of 100-3.4 kHz, and the broadband call mode generally supports a frequency band of 100 kHz-6.3 kHz. Based on this, the second sub frequency band may be set to 3 kHz-6.3 kHz. In this way, when it is determined that the earphone 10a belongs to the fourth type of abnormal state, its broadband call mode may be disabled and the narrowband call mode may be enabled, thereby avoiding high-frequency noise from affecting the quality of the call and improving the performance of the earphone.

It should be noted that, an execution subject of each step of the method provided in the foregoing embodiment may be the same device, or the method may also be executed by different devices. For example, an execution subject of steps 201 and 202 may be device A; for another example, the execution subject of step 201 and step 202 may be device A, and an execution subject of step 202 may be device B.

In addition, in some of the processes described in the above embodiments and drawings, multiple operations appearing in a specific order are included, but it should be understood that these operations may be executed in parallel or executed out of the order in which they appear in this document. The sequence numbers of operations, such as 201, 202, are only used to distinguish different operations, and the sequence numbers themselves do not represent any execution order. In addition, these processes may include more or fewer operations, and these operations may be executed sequentially or in parallel. It should be noted that the descriptions of "first" and "second" in this document are used to distinguish different messages, devices or modules, and do not represent a sequence, nor do they limit that the "first" and "second" are different types.

Correspondingly, a computer-readable storage medium with computer program stored thereon is also provided in the embodiments of the present disclosure, and when the computer program is executed, the steps in the method executed by the earphone can be implemented.

Figure 3:
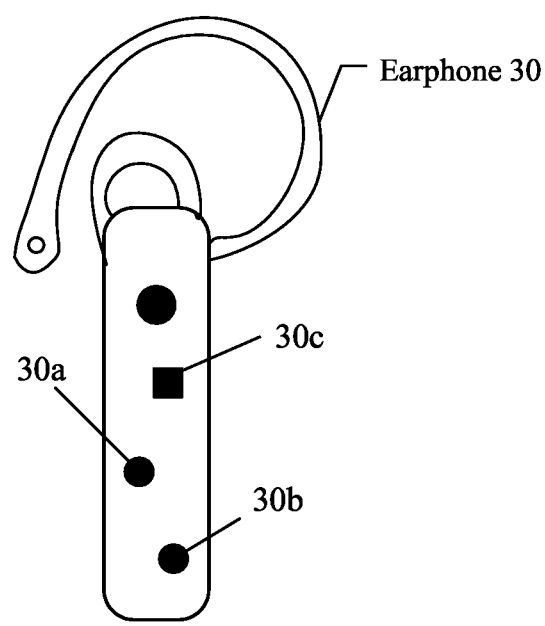
FIG. 3 is a structure diagram of an earphone according to an embodiment of the present disclosure.

FIG. 3 is a structure diagram of an earphone according to an embodiment of the present disclosure. As illustrated in FIG. 3, the earphone 30 includes a primary microphone 30a, a secondary microphone 30b, and a processor 30c. The implementation forms and setting positions of the earphone 30, the primary microphone 30a, the secondary microphone 30b, and the processor 30c illustrated in FIG. 3 are only exemplary descriptions and do not intend to limit.

The primary microphone 30a and the secondary microphone 30b are configured to pick up sound signals from a specified sound source (which is not illustrated in FIG. 3).

The processor 30c is configured to: obtain the sound signals picked up by the primary microphone 30a and the secondary microphone 30b from the specified sound source when the earphone 30 is in a self-detection state; determine a type of abnormal state of the earphone 30 according to frequency response curves of the sound signals picked up by the primary microphone 30a and the secondary microphone 30b; and process abnormality on the earphone 30 by using a processing manner adapted to the type of abnormal state of the earphone 30.

Optionally, in this embodiment, the specified sound source has fixed relative position relationships with the primary microphone 30a and the secondary microphone 30b. Further, the specified sound source may be placed on a midperpendicular of a connecting line between the primary microphone 30a and the secondary microphone 30b.

In this embodiment, the earphone 30 has a call function, and is provided with the primary microphone 30a and the secondary microphone 30b. In the embodiment of the present disclosure, a specific implementation form of the earphone 30 is not limited. It may be a Bluetooth earphone, or may be classified into mono and dual from the number of channels, or may be classified into Head-mounted, in-ear, and hanging-ear in terms of wearing mode, which is not limited to this.

The earphone provided in this embodiment adds a function of abnormal state self-detection to an existing dual-microphone earphone. When the earphone is in the self-detection state, the sound signals picked up by the primary microphone and the secondary microphone from the specified sound source are obtained; the type of abnormal state of the earphone is determined according to frequency response curves of the sound signals picked up by the primary microphone and the secondary microphone, and then the abnormality of the earphone is processed by using the processing manner adapted to the type of abnormal state of the earphone, which solves the problem in the prior art that the abnormal sound pickup of the earphone cannot be processed, thereby not only improving the performance of the earphone, but also increasing its service life.

In the embodiments of the present disclosure, in response to the self-detection instruction sent by the user, the earphone may enter the self-detection state. A self-detection period may be preset. Whenever the self-detection period is reached, the earphone enters the self-detection state. Specific implementation manners may refer to relevant content of the implementations 1 to 4 in the foregoing system embodiment, which is not repeated here.

It is to be noted that, for the implementation 1 described above, a self-detection button (not shown in FIG. 3) may be provided on the earphone 30. For the implementation 2 described above, a voice recognition module (not shown in FIG. 3) may be provided on the earphone 30. For the implementation 3 described above, a voice playback module (not shown in FIG. 3) may be provided on the earphone 30. For the implementation 4 described above, a communication component (not shown in FIG. 3) may be provided on the earphone 30. The embodiments of the present application do not limit installation positions of these components.

In the implementation 4 described above, the communication component is used to receive the self-detection instruction sent by a terminal device. The communication component may be configured to facilitate wired or wireless communication between the earphone 30 and other devices. The earphone 30 may be connected to a wireless network based on a communication standard, such as WiFi, 2G or 3G or a combination thereof. In an exemplary embodiment, the communication component receives a broadcast signal or broadcast related information from an external broadcast management system via a broadcast channel. In an exemplary embodiment, the communication component further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an optional embodiment, in determining the type of abnormal state, the processor 30c is specifically configured to obtain signal sensitivities of the primary microphone 30a and the secondary microphone 30b in the set frequency band respectively according to the frequency response curves of the sound signals picked up by the primary microphone 30a and the secondary microphone 30b. If the signal sensitivity of only one of the primary microphone 30a and the secondary microphone 30b in the set frequency band is greater than a preset sensitivity threshold, it is determined that the earphone is abnormal and belongs to a first type of abnormal state.

Further, in determining the type of abnormal state, the processor 30c is specifically configured to calculate, when the earphone 30 does not belong to the first type of abnormal state, difference between the frequency response curves of the sound signals picked up by the primary microphone 30a and the secondary microphone 30b to obtain a frequency response difference curve; and if an absolute value of the frequency response difference curve in the set frequency band is within a first sensitivity range, it is determined that the earphone 30 is abnormal and belongs to a second type of abnormal state.

Further, when it is determined that the absolute value of the frequency response difference curve in the set frequency band is not within the first sensitivity range, the processor 30c is specifically configured to select a first sub frequency band from the set frequency band, an upper limit frequency of the first sub frequency band is the same with that of the set frequency band; if the absolute value of the frequency response difference curve in the first sub frequency band is within a second sensitivity range, it is determined that the earphone 30 is abnormal and belongs to a third type of abnormal state.

Further, when it is determined that the absolute value of the frequency response difference curve in the first sub frequency band is not within the second sensitivity range, the processer 30c is specifically configured to select a second sub frequency band from the first sub frequency band, an upper limit frequency of the second sub frequency band is the same as that of the first sub frequency band. If an absolute value of the frequency response difference curve in the second sub frequency band is greater than the upper limit value of the second sensitivity range, it is determined that the earphone 30 is abnormal and belongs to a fourth type of abnormal state.

Based on the above determined type of abnormal state of the earphone 30, in processing abnormality on the earphone 30, the processor 30c is specifically configured to: switch a double microphone noise reduction algorithm to a single microphone noise reduction algorithm if the abnormal state of the earphone 30 belongs to the first type of abnormal state; perform gain compensation on the microphone with lower sensitivity to the sound signal among the primary microphone 30a and the secondary microphone 30b if the abnormal state of the earphone 30 belongs to the second or third type of abnormal state; and disable a broadband call mode of the earphone 30 if the abnormal state of the earphone 30 belongs to the fourth abnormal state.

Further, optionally, in performing gain compensation on the microphone with lower sensitivity to the sound signal among the primary microphone 30a and the secondary microphone 30b, the processer 30c is specifically configured to: perform, if the abnormal state of the earphone 30 belongs to the second type of abnormal state, gain compensation on the microphone with the lower sensitivity according to the sensitivity of the frequency response difference curve in the set frequency band, so that the sensitivity of the corrected frequency response difference curve in the set frequency band is smaller than a lower limit sensitivity value of the first sensitivity range; and perform, if the abnormal state of the earphone 30 belongs to the third type of abnormal state, gain compensation on the microphone with the lower sensitivity in the first sub frequency band by using a EQ compensation algorithm, so that the sensitivity of the corrected frequency response difference curve in the first sub frequency band is smaller than a lower limit sensitivity value of the second sensitivity range.

It should be noted that a specific description and explanation of the abnormal determination and processing of the processor 30c in the earphone 30 may be found from relevant description in the foregoing system embodiment, which is not be repeated here.

Further, the earphone 30 further includes other components such as a memory and a power supply component (not shown in FIG. 3), but are not limited to these.

The memory may be implemented by any type of volatile or non-volatile storage devices or their combination, such as static random access memory (SRAM), electrically erasable programmable read-only memory (EEPROM), erasable Programmable read only memory (EPROM), programmable read only memory (PROM), read only memory (ROM), magnetic memory, flash memory, magnetic disk, and optical disk.

The power supply component provides power for various components of the earphone 30. The power supply component may include a power management system, one or more power supplies, and other components associated with generating, managing, and distributing power for the device where the power supply component is located.

Those skilled in the art should understand that the embodiments of the present disclosure may be provided as methods, systems, or computer program products. Therefore, the present disclosure may adopt the form of a complete hardware embodiment, a complete software embodiment, or an embodiment combining software and hardware. Moreover, the present disclosure may adopt the form of a computer program product implemented on one or more computer-usable storage medium (including but not limited to disk storage, CD-ROM, and optical storage) containing computer-usable program codes.

The present disclosure is described with reference to flowcharts and/or block diagrams of methods, devices (systems), and computer program products according to embodiments of the present disclosure. It should be understood that each process and/or block in the flowchart and/or block diagram, and the combination of processes and/or blocks in the flowchart and/or block diagram may be realized by computer program instructions. These computer program instructions may be provided to the processor of a general-purpose computer, a special-purpose computer, an embedded processor, or other programmable data processing device to generate a machine, so that a device for realizing the functions specified in one process or multiple processes in the flowchart and/or one block or multiple blocks in the block diagram may be generated by executing the instructions by the processor of the computer or other programmable data processing device.

These computer program instructions may also be stored in a computer-readable memory that may direct a computer or other programmable data processing device to work in a specific manner, so that the instructions stored in the computer-readable memory produce an article of manufacture including the instruction device. The instruction device implements the functions specified in one process or multiple processes in the flowchart and/or one block or multiple blocks in the block diagram.

These computer program instructions may also be loaded on a computer or other programmable data processing device, so that a series of operation steps are executed on the computer or other programmable device to produce computer-implemented processing, so that instructions executed by the computer or other programmable device provide steps for implementing functions specified in a flow or multiple flows in the flowchart and/or a block or multiple blocks in the block diagram.

In a typical configuration, the computing device includes one or more processors (CPU), input/output interfaces, network interfaces, and memory.

Memory may include non-permanent memory, random access memory (RAM), and/or non-volatile memory of a computer-readable medium, such as read-only memory (ROM) or flash memory (flash RAM). Memory is an example of computer readable media.

A computer-readable medium includes permanent and non-permanent, removable and non-removable media, and information storage may be realized by any method or technology. The information may be computer-readable instructions, data structures, program modules, or other data. Examples of the computer storage medium include but not limited to phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, CD-ROM, digital versatile disc (DVD) or other optical storage, magnetic cassettes, magnetic tape magnetic disk storage or other magnetic storage devices or any other non-transmission media, and may be used to store information that may be accessed by a computing device. According to the definition in this description, the computer-readable medium does not include transitory media, such as modulated data signals and carrier waves.

It should also be noted that terms "include", "comprise" or any other variations are intended to cover non-exclusive "include", thus a process, a method, an object or a device including a series of factors not only include the listed factors, but also include other factors not explicitly listed, or also include inherent factors of the process, the method, the object or the device. Without more limitations, a factor defined by a sentence "include one . . . " does not exclude a case that there is another same factor in the process, the method, the object or the device including the described factor.

The description of the above examples is only used to help understand of the embodiments of the present disclosure and is not used to limit the present disclosure. For those skilled in the art, the present disclosure may have various changes and variation. Modifications, equivalent replacement, and improvements without departing from the spirit and principle of the present disclosure also fall within the claims of the present disclosure.

The invention claimed is:

1. A method for processing earphone abnormality, which is applied to an earphone including a primary microphone and a secondary microphone, comprising:
   obtaining sound signals picked up by the primary microphone and the secondary microphone from a specified sound source when the earphone is in a self-detection state;
   obtaining signal sensitivities of the primary microphone and the secondary microphone in a set frequency band according to frequency response curves of sound signals picked up by the primary microphone and the secondary microphone respectively;
   determining that a signal sensitivity of only one of the primary microphone and the secondary microphone in the set frequency band is greater than a preset sensitivity threshold; and
   in response to determining that the signal sensitivity of only one of the primary microphone and the secondary microphone in the set frequency band is greater than a preset sensitivity threshold, switching a dual-microphone noise reduction algorithm to a single microphone noise reduction algorithm.

2. The method according to claim 1, wherein a distance between the specified sound source and the primary microphone is equal to a distance between the specified sound source and the secondary microphone.

3. The method according to claim 1, wherein the method further comprises:
   controlling, in response to a self-detection instruction issued when a user finds that the earphone picks up abnormally, the earphone to enter a self-detection state; or,
   controlling, whenever a self-detection period arrives, the earphone to enter the self-detection state.

4. A method for processing earphone abnormality, which is applied to an earphone including a primary microphone and a secondary microphone, comprising:
   obtaining sound signals picked up by the primary microphone and the secondary microphone from a specified sound source when the earphone is in a self-detection state;
   obtaining signal sensitivities of the primary microphone and the secondary microphone in a set frequency band according to frequency response curves of sound signals picked up by the primary microphone and the secondary microphone respectively;
   in response to determining that it is not a case where the signal sensitivity of only one of the primary microphone and the secondary microphone in the set frequency band is greater than a preset sensitivity threshold, calculating a difference between the frequency response curves of the sound signals picked up by the primary microphone and the secondary microphone to obtain a frequency response difference curve; and
   performing, if an absolute value of the frequency response difference curve in the set frequency band is within a first sensitivity range, gain compensation on one microphone of the primary microphone and the secondary microphone which picks up the sound signal with the lower sensitivity.

5. The method according to claim 4, wherein the performing gain compensation on one microphone of the primary microphone and the secondary microphone which picks up the sound signal with the lower sensitivity comprises:
   performing gain compensation on the microphone with the lower sensitivity according to a sensitivity of the frequency response difference curve in the set frequency band, to cause a sensitivity of a corrected frequency response difference curve in the set frequency band to be less than a lower limit sensitivity value of the first sensitivity range.

6. A method for processing earphone abnormality, which is applied to an earphone including a primary microphone and a secondary microphone, comprising:
   obtaining sound signals picked up by the primary microphone and the secondary microphone from a specified sound source when the earphone is in a self-detection state;
   obtaining signal sensitivities of the primary microphone and the secondary microphone in a set frequency band according to frequency response curves of sound signals picked up by the primary microphone and the secondary microphone respectively;
   in response to determining that it is not a case where the signal sensitivity of only one of the primary microphone and the secondary microphone in the set frequency band is greater than a preset sensitivity threshold, calculating difference between the frequency response curves of the sound signals picked up by the primary microphone and the secondary microphone to obtain a frequency response difference curve;
   selecting, if the absolute value of the frequency response difference curve in the set frequency band is not within the first sensitivity range, a first sub frequency band from the set frequency band, wherein an upper limit frequency of the first sub frequency band is the same as an upper limit frequency of the set frequency band; and
   performing, if an absolute value of the frequency response difference curve in the first sub frequency band is within a second sensitivity range, gain compensation on one microphone of the primary microphone and the secondary microphone which picks up the sound signal with the lower sensitivity.

7. The method according to claim 6, wherein the performing gain compensation on one microphone of the primary microphone and the secondary microphone which picks up the sound signal with the lower sensitivity comprises:

performing gain compensation on the microphone with the lower sensitivity in the first sub frequency band by using an EQ compensation algorithm, to cause a sensitivity of a corrected frequency response difference curve in the first sub frequency band to be less than a lower limit sensitivity value of the second sensitivity range.

8. A method for processing earphone abnormality, which is applied to an earphone including a primary microphone and a secondary microphone, comprising:
obtaining sound signals picked up by the primary microphone and the secondary microphone from a specified sound source when the earphone is in a self-detection state;
obtaining signal sensitivities of the primary microphone and the secondary microphone in a set frequency band according to frequency response curves of sound signals picked up by the primary microphone and the secondary microphone respectively;
in response to determining that it is not a case where the signal sensitivity of only one of the primary microphone and the secondary microphone in the set frequency band is greater than a preset sensitivity threshold, calculating difference between the frequency response curves of the sound signals picked up by the primary microphone and the secondary microphone to obtain a frequency response difference curve;
selecting, if the absolute value of the frequency response difference curve in the set frequency band is not within the first sensitivity range, a first sub frequency band from the set frequency band, wherein an upper limit frequency of the first sub frequency band is the same as an upper limit frequency of the set frequency band;
selecting, if the absolute value of the frequency response difference curve in the first sub frequency band is not within the second sensitivity range, a second sub frequency band from the first sub frequency band, wherein an upper limit frequency of the second sub frequency band is the same as the upper limit frequency of the first sub frequency band; and
disabling, if an absolute value of the frequency response difference curve in the second sub frequency band is larger than an upper limit value of the second sensitivity range, a broadband call mode of the earphone.

9. An earphone, comprising a primary microphone, a secondary microphone, and a processor,
wherein the primary microphone and the secondary microphone are configured to pick up sound signals from a specified sound source;
the processor is configured to perform at least one of four operations:
first operation:
obtain the sound signals picked up by the primary microphone and the secondary microphone from the specified sound source when the earphone is in a self-detection state;
obtaining signal sensitivities of the primary microphone and the secondary microphone in a set frequency band according to frequency response curves of sound signals picked up by the primary microphone and the secondary microphone respectively; and
in response to determining that the signal sensitivity of only one of the primary microphone and the secondary microphone in the set frequency band is greater than a preset sensitivity threshold, switching a dual-microphone noise reduction algorithm to a single microphone noise reduction algorithm;

second operation:
obtaining sound signals picked up by the primary microphone and the secondary microphone from a specified sound source when the earphone is in a self-detection state;
obtaining signal sensitivities of the primary microphone and the secondary microphone in a set frequency band according to frequency response curves of sound signals picked up by the primary microphone and the secondary microphone respectively;
in response to determining that it is not a case where the signal sensitivity of only one of the primary microphone and the secondary microphone in the set frequency band is greater than a preset sensitivity threshold, calculating difference between the frequency response curves of the sound signals picked up by the primary microphone and the secondary microphone to obtain a frequency response difference curve; and
performing, if an absolute value of the frequency response difference curve in the set frequency band is within a first sensitivity range, gain compensation on one microphone of the primary microphone and the secondary microphone which picks up the sound signal with the lower sensitivity;
third operation:
obtaining sound signals picked up by the primary microphone and the secondary microphone from a specified sound source when the earphone is in a self-detection state;
obtaining signal sensitivities of the primary microphone and the secondary microphone in a set frequency band according to frequency response curves of sound signals picked up by the primary microphone and the secondary microphone respectively;
in response to determining that it is not a case where the signal sensitivity of only one of the primary microphone and the secondary microphone in the set frequency band is greater than a preset sensitivity threshold, calculating difference between the frequency response curves of the sound signals picked up by the primary microphone and the secondary microphone to obtain a frequency response difference curve;
selecting, if the absolute value of the frequency response difference curve in the set frequency band is not within the first sensitivity range, a first sub frequency band from the set frequency band, wherein an upper limit frequency of the first sub frequency band is the same as an upper limit frequency of the set frequency band; and
performing, if an absolute value of the frequency response difference curve in the first sub frequency band is within a second sensitivity range, gain compensation on one microphone of the primary microphone and the secondary microphone which picks up the sound signal with the lower sensitivity;
fourth operation:
obtaining sound signals picked up by the primary microphone and the secondary microphone from a specified sound source when the earphone is in a self-detection state;
obtaining signal sensitivities of the primary microphone and the secondary microphone in a set frequency band according to frequency response curves of sound signals picked up by the primary microphone and the secondary microphone respectively;
in response to determining that it is not a case where the signal sensitivity of only one of the primary microphone and the secondary microphone in the set frequency band is greater than a preset sensitivity threshold, calculating difference between the frequency response curves of the sound signals picked up by the primary microphone and the secondary microphone to obtain a frequency response difference curve;

selecting, if the absolute value of the frequency response difference curve in the set frequency band is not within the first sensitivity range, a first sub frequency band from the set frequency band, wherein an upper limit frequency of the first sub frequency band is the same as an upper limit frequency of the set frequency band;

selecting, if the absolute value of the frequency response difference curve in the first sub frequency band is not within the second sensitivity range, a second sub frequency band from the first sub frequency band, wherein an upper limit frequency of the second sub frequency band is the same as the upper limit frequency of the first sub frequency band; and disabling, if an absolute value of the frequency response difference curve in the second sub frequency band is larger than an upper limit value of the second sensitivity range, a broadband call mode of the earphone.

10. A system for processing earphone abnormality, comprising an earphone according to claim 9 and a sound source device, wherein the sound source device has fixed relative positions with the primary microphone and the secondary microphone;

the sound source device is configured to play a sound signal for the primary microphone and the secondary microphone to pick up.

11. The system according to claim 10, wherein the sound source device is a terminal device;

the terminal device is configured to obtain, in response to a playing operation of a user, a pre-stored sound signal whose signal sensitivity fluctuation rate is less than a set threshold, and play the sound signal.

* * * * *